United States Patent
Piper et al.

(10) Patent No.: US 6,500,505 B2
(45) Date of Patent: Dec. 31, 2002

(54) THERMOPLASTIC FILM WITH GOOD INTERPLY ADHESION

(75) Inventors: Graham R. Piper, Greenville, SC (US); Ram K. Ramesh, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/079,787

(22) Filed: May 15, 1998

(65) Prior Publication Data

US 2002/0160129 A1 Oct. 31, 2002

(51) Int. Cl.⁷ ............................ B32B 27/32; B65D 81/34
(52) U.S. Cl. .................... 428/34.8; 428/34.9; 428/35.2; 428/35.4; 428/412; 428/424.2; 428/476.3; 428/483; 428/516; 428/517; 428/518; 156/85; 156/86; 426/127; 426/129
(58) Field of Search ................. 428/34.3, 34.8, 428/35.2, 35.4, 35.7, 200, 347, 412, 424.2, 423.1, 474.4, 476.3, 480, 483, 500, 516, 521, 524, 34.9, 518, 517; 383/113, 105, 118; 426/127, 129; 156/84, 85, 86

(56) References Cited

U.S. PATENT DOCUMENTS

| | | |
|---|---|---|
| 4,064,296 A | 12/1977 | Bornstein et al. |
| 4,194,039 A | 3/1980 | Mueller ................ 428/213 |
| 4,352,849 A | 10/1982 | Mueller ................ 428/213 |
| 4,448,792 A | 5/1984 | Schirmer ............... 426/113 |
| 4,469,742 A | 9/1984 | Oberle et al. |
| 4,643,926 A | 2/1987 | Mueller ................ 428/35 |
| 4,755,402 A | 7/1988 | Oberle |
| 4,762,748 A | 8/1988 | Oberle |
| 4,784,863 A | 11/1988 | Lustig et al. |
| 4,855,183 A | 8/1989 | Oberle |
| 4,948,643 A | 8/1990 | Mueller ................ 428/36.6 |
| 5,139,831 A | 8/1992 | Mueller ................ 428/34.3 |
| 5,389,448 A | 2/1995 | Schirmer et al. ......... 428/517 |
| 5,482,771 A * | 1/1996 | Shah ..................... 428/348 |
| 5,486,387 A | 1/1996 | Mueller ................ 428/34.7 |
| 5,695,840 A | 12/1997 | Mueller ................ 428/35.7 |
| 5,759,648 A | 6/1998 | Idlas |
| 5,789,046 A | 8/1998 | Mueller ............... 428/35.02 |

FOREIGN PATENT DOCUMENTS

| | | |
|---|---|---|
| AU | 672222 | 3/1994 |
| CA | 2117574 | 10/1995 |
| CA | 2172031 | 9/1996 |
| EP | 144642 A * | 6/1985 |
| EP | 0 597 502 A2 | 5/1994 |
| EP | 0 688 667 A1 | 6/1995 |
| EP | 0 700 778 A2 | 3/1996 |
| EP | 0 763 422 A1 | 3/1997 |
| EP | 0 802 046 A2 | 10/1997 |
| EP | 0 816 069 A2 | 1/1998 |
| JP | 7-286088 | 10/1995 |
| JP | 9141793 | 6/1997 |
| WO | WO 95/15851 | 6/1995 |
| WO | WO 95/34396 | 12/1995 |
| WO | WO 96/32441 | 10/1996 |

* cited by examiner

*Primary Examiner*—Rena L. Dye
(74) *Attorney, Agent, or Firm*—Daniel B. Ruble

(57) ABSTRACT

A multilayer film including an outer layer that includes a homo- or interpolymer of propylene and, directly adhered to the outer layer, a layer that includes a homogeneous ethylene/α-olefin interpolymer having a density of no more than about 0.91 g/cm³ exhibits good seal strength and good adhesion between the two layers, even in areas where the film is sealed, even after the film is oriented, even when the film is subjected to the elevated temperatures involved in cook-in procedures, and even where the film is subjected to, e.g., grease from fatty foods. The film also can include one or more, for example, bulk layers, $O_2$-barrier layers, and/or abuse layers.

38 Claims, No Drawings

THERMOPLASTIC FILM WITH GOOD INTERPLY ADHESION

BACKGROUND INFORMATION

1. Field of the Invention

This invention relates generally to thermoplastic packaging materials and, more specifically, to flexible, multilayer films.

2. Background of the Invention

Many food products are processed in thermoplastic film packages by subjecting the packaged product to elevated temperatures produced by, for example, immersion in hot water or exposure to steam. Such thermal processing often is referred to as cook-in, and films used in such processes are known as cook-in films.

A food product that is packaged and processed in this manner can be refrigerated, shipped, and stored until the food product is to be consumed or further processed by, for example, slicing and repackaging into smaller portions for retail display. Alternatively, the processed food can be removed immediately from the cook-in package for consumption or further processing (e.g., sliced and repackaged).

A cook-in film must be capable of withstanding exposure to rather severe temperature conditions for extended periods of time while not compromising its ability to contain the food product. Cook-in processes typically involve a long cook cycle. Submersion in hot (i.e., about 55° to 65° C.) water for up to about 4 hours is common; submersion in 70° to 100° C. water or exposure to steam for up to 12 hours is not uncommon, although most cook-in procedures normally do not involve temperatures in excess of about 90° C. During such extended periods of time at elevated temperatures, any seams in a package formed from a cook-in film preferably resist failure (i.e., pulling apart).

Following the cook-in process, the film or package preferably conforms, if not completely then at least substantially, to the shape of the contained food product. Often, this is achieved by allowing the film to heat shrink under cook-in conditions so as to form a tightly fitting package. In other words, the cook-in film desirably possesses sufficient shrink energy such that the amount of thermal energy used to cook the food product also is adequate to shrink the packaging film snugly around the contained product. Alternatively, the cook-in film package can be caused to shrink around the contained food product prior to initiating the cook-in procedure by, for example, placing the package in a heated environment prior to cooking.

Some cook-in applications impose some very stringent performance requirements on films for use therewith. For example, some food products that are processed via cook-in procedures are oxygen sensitive. Cook-in films for these products need to include one or more oxygen barrier layers. Other cook-in applications require that the film or the package made therefrom be printable and be able to retain any image printed thereon.

An increasingly important requirement of cook-in films is that they have good interply adhesion. This is complicated where a layer derived primarily from a homo- or interpolymer of propylene is to be adhered directly to a layer derived primarily from a homo- or interpolymer of ethylene. Although ethylene and propylene are homologues, polymers made from one tend not to adhere well to polymers made from the other. One attempt to counteract this tendency toward poor adhesion has involved blending a polymer including mer units derived from propylene with the homo- or interpolymer of ethylene so as to increase the compatibility of the layer formed therefrom with the layer derived primarily from a homo- or interpolymer of propylene. However, even where such a film as made exhibits good interply adhesion, that same film can exhibit mediocre or even poor interply adhesion after it is oriented.

Further, when films of this type are sealed, the sealing process can induce delamination between the seal layer and the layer adjacent thereto. During the cooking process, these same two layers must provide the film with structural integrity and support the seal formed in the seal layer. Also, the seal layer needs to be able to resist the degenerative effects of grease and/or fatty products which often are encountered during cook-in processes. Thus, the need remains for an oriented film with good interply adhesion and sealability.

SUMMARY OF THE INVENTION

Briefly, the present invention provides an oriented multilayer film that includes at least two layers. One of these layers is an outer layer that includes a polymer including mer units derived from propylene. Directly adhered to this outer layer is a layer that includes a homogeneous ethylene/α-olefin interpolymer having a density of no more than about 0.915 g/cm$^3$. The film also can include one or more other layers such as, for example, bulk layers, O$_2$-barrier layers, and/or abuse layers.

Articles made from the above-described film (e.g., bags), methods of making the film, and methods of using the film also are provided.

Those of ordinary skill in the art have recognized that polymers derived primarily from propylene and polymers derived primarily from ethylene tend not to adhere well to each other. Films including adjacent layers derived from these dissimilar materials can have less-than-optimal orientability, degraded optics, and/or gauge non-uniformities, perhaps due to differential stresses within the layers. Nevertheless, the work leading to the film of the present invention has shown that layers including a homogeneous ethylene/α-olefin interpolymer having a density of less than about 0.915 g/cm$^3$ have good bond strength with layers including a propylene homo- or interpolymer, that a film including such layers can have good optics, and that a film including such layers can have a uniform gauge. In view of the fact that interply bond strength is known to decrease significantly as molecular orientation increases (as occurs when a film is oriented), the good interply adhesion exhibited by the oriented film of the present invention is even further surprising.

Also, ethylene/α-olefin interpolymers, especially homogeneous ethylene/α-olefin interpolymers typically have relatively low Vicat softening points and can soften at or near the temperatures involved in cook-in procedures. Thus, the fact that the film of the present invention has good seal strength and interply adhesion at elevated temperatures is surprising.

To assist in understanding the more detailed description of the invention that follows, certain definitions are provided immediately below. These definitions apply hereinthroughout unless a contrary intention is explicitly indicated:

"polymer" means the polymerization product of one or more monomers and is inclusive of homopolymers as well as copolymers, terpolymers, tetrapolymers, etc., and blends and modifications of any of the foregoing;

"mer unit" means that portion of a polymer derived from a single reactant molecule; for example, a mer unit from ethylene has the general formula —CH$_2$CH$_2$—;

"homopolymer" means a polymer consisting essentially of a single type of repeating mer unit;

"copolymer" means a polymer that includes mer units derived from two reactants (normally monomers) and is inclusive of random, block, segmented, graft, etc., copolymers;

"interpolymer" means a polymer that includes mer units derived from at least two reactants (normally monomers) and is inclusive of copolymers, terpolymers, tetrapolymers, and the like;

"polyolefin" means a polymer in which some mer units are derived from an olefinic monomer which can be linear, branched, cyclic, aliphatic, aromatic, substituted, or unsubstituted (e.g., olefin homopolymers, interpolymers of two or more olefins, copolymers of an olefin and a non-olefinic comonomer such as a vinyl monomer, and the like);

"(meth)acrylic acid" means acrylic acid and/or methacrylic acid;

"(meth)acrylate" means acrylate and/or methacrylate;

"anhydride-grafted" means a group containing an anhydride moiety, such as that derived from maleic acid, fumaric acid, etc., has been chemically attached to or affiliated with a given polymer;

"permeance" (in the packaging industry, "permeance" often is referred to as "transmission rate") means the volume of a gas (e.g., $O_2$) that passes through a given cross section of film (or layer of a film) at a particular temperature and relative humidity when measured according to a standard test such as, for example, ASTM D 1434 or D 3985;

"longitudinal direction" means that direction along the length of a film, i.e., in the direction of the film as it is formed during extrusion and/or coating;

"transverse direction" means that direction across the film and perpendicular to the machine direction;

"free shrink" means the percent dimensional change, as measured by ASTM D 2732 (incorporated herein by reference), in a 10 cm×10 cm specimen of film when subjected to heat;

"shrink tension" means the force per average cross-sectional area developed in a film, in a specified direction and at a specified elevated temperature, as the film attempts to shrink at that temperature while being restrained (measured in accordance with ASTM D 2838, which is incorporated herein by reference);

as a verb, "laminate" means to affix or adhere (by means of, for example, adhesive bonding, pressure bonding, corona lamination, and the like) two or more separately made film articles to one another so as to form a multilayer structure; as a noun, "laminate" means a product produced by the affixing or adhering just described;

"directly adhered," as applied to film layers, means adhesion of the subject film layer to the object film layer, without a tie layer, adhesive, or other layer therebetween;

"between," as applied to film layers, means that the subject layer is disposed in the midst of two object layers, regardless of whether the subject layer is directly adhered to the object layers or whether the subject layer is separated from the object layers by one or more additional layers;

"inner layer" means a layer of a film having each of its principal surfaces directly adhered to one other layer of the film;

"outer layer" means a layer of a film having less than both of its principal surfaces directly adhered to other layers of the film;

"inside layer" means the outer layer of a film in which a product is packaged that is closest, relative to the other layers of the film, to the packaged product;

"outside layer" means the outer layer of a film in which a product is packaged that is farthest, relative to the other layers of the film, from the packaged product;

"barrier layer" means a film layer with a low permeance toward one or more gases (e.g., $O_2$);

"abuse layer" means an outer layer and/or an inner layer that resists abrasion, puncture, and other potential causes of reduction of package integrity and/or appearance quality;

"tie layer" means an inner layer having the primary purpose of providing interlayer adhesion to adjacent layers that include otherwise non-adhering polymers;

"bulk layer" means any layer which has the purpose of increasing the abuse resistance, toughness, modulus, orientability, etc., of a multilayer film and generally comprises polymers that are inexpensive relative to other polymers in the film;

"seal layer" (or "sealing layer" or "heat seal layer" or "sealant layer") means the outer layer(s) involved in the sealing of the film to itself, another layer of the same or another film, and/or another article which is not a film and
  (a) with respect to packages with fin seals, the phrase generally refers to the inside layer, which frequently also serves as a food-contact layer in the packaging of foods (although, in a multilayer film, the composition of the other layers within about 0.075 mm of the surface also can affect sealability and seal strength), or
  (b) with respect to packages with lap seals, the phrase generally refers to both the inside and outside layers of the film.

as a noun, "seal" means a bond of a first region of a film surface to a second region of a film surface (or opposing film surfaces) created by heating (e.g., by means of a heated bar, hot wire, hot air, infrared radiation, ultrasonic sealing, etc.) the regions (or surfaces) to at least their respective softening points;

"corona treatment" or "corona discharge treatment" means a process in which one or both primary surfaces of a thermoplastic film are subjected to the ionization product of a gas (e.g., air) in close proximity with the film surface(s) so as to cause oxidation and/or other changes to the film surface(s); and "cook" means to heat a food product thereby effecting a change in one or more of the physical or chemical properties thereof (e.g., color, texture, taste, and the like).

Some films, including many which are used in cook-in processes, are oriented prior to use. Orientation involves stretching a film at an elevated temperature (the orientation temperature) followed by setting the film in the stretched configuration (e.g., by cooling). When an unrestrained, non-annealed, oriented polymeric film subsequently is heated to its orientation temperature, heat shrinkage occurs and the film returns almost completely to its original, i.e., pre-oriented, dimensions.

An oriented film has an orientation ratio, which is the multiplication product of the extent to which the film has been expanded in several directions, usually two directions perpendicular to one another. Expansion in the longitudinal direction, sometimes referred to as the machine direction, occurs in the direction the film is formed during extrusion and/or coating. Expansion in the transverse direction means expansion across the width of the film and is perpendicular to the longitudinal direction.

DETAILED DESCRIPTION OF ILLUSTRATIVE EMBODIMENTS

The first layer of the multilayer film of the present invention includes a polymer that includes mer units derived from propylene. Preferably, this polymer includes mer units derived from one or more other monomers, most preferably from a monomer having a general formula $$H_2C=CR^1R^2$$

where, independently, $R^1$ is H or a $C_1-C_6$ alkyl group and $R^2$ is H, a $C_2-C_6$ alkyl group, or a $C(O)OR^3$ group wherein $R^3$ is H or a $C_1-C_6$ alkyl group. Examples of preferred comonomers include $C_4-C_8$ α-olefins, ethylene, ethylenically unsaturated acids, and ethylenically unsaturated esters. Useful ethylenically unsaturated acids have the general formula $CH_2=CRCOOH$ where R is hydrogen or a $C_1-C_{15}$, preferably $C_1-C_{10}$, more preferably $C_1-C_5$ alkyl, cycloalkyl, aryl, alkoxy, etc., group. The specific identity of the R group is unimportant as long as it does not interfere with the ability of the ethylenically unsaturated acid to copolymerize with the propylene. A preferred ethylenically unsaturated acid is (meth)acrylic acid, with acrylic acid being particularly preferred. (Useful ethylenically unsaturated esters have the same general formula with the exception that the hydroxyl hydrogen atom is replaced by a $C_1-C_6$ alkyl group.)

Preferred interpolymers include propylene/$C_4-C_8$ α-olefin copolymer (particularly where the α-olefin comonomer is 1-butene, 1-hexene, or 1-octene, particularly 1-butene) and propylene/ethylene copolymer. In such copolymers, the mer content derived from propylene preferably is at least about 50%, more preferably at least about 75%, even more preferably at least about 80%, still more preferably at least about 85%, yet still more preferably at least about 90%, even further preferably at least about 92.5%, and most preferably at least about 95%.

The propylene interpolymer in the outer layer preferably has a melting point of no more than about 155° C., more preferably no more than about 150° C., even more preferably no more than about 145° C., and most preferably no more than about 140° C. In certain preferred embodiments, the propylene interpolymer has a melting point of from about 100° C. to about 150° C., even more preferably of from about 110° C. about 145° C. The propylene interpolymer in the outer layer also preferably has a Vicat softening point of at least about 80° C., more preferably at least about 90° C., even more preferably at least about 100° C., yet more preferably at least about 105° C., still more preferably at least about 110° C., and most preferably at least about 115° C. The propylene interpolymer can be isotactic, syndiotactic, or atactic.

The propylene interpolymer of the outer layer preferably has a melt index of from about 0.3 to about 50 g/10 min, more preferably of from about 1 to about 20 g/10 min, still more preferably of from about 2 to about 15 g/10 min, even more preferably of from about 3 to about 12 g/10 min, and still more preferably of from about 4 to about 10 g/10 min. Melt index, as used herein, is measured at 230° C. and according to the procedure set forth in ASTM D 1238, which is incorporated herein by reference.

The outer layer preferably includes at least about 20% (by wt.), more preferably at least about 50% (by wt.), even more preferably at least about 70% (by wt.), still more preferably at least about 80% (by wt.), and most preferably at least about 90% (by wt.) of the propylene interpolymer. However, where desired to change or enhance the properties of the outer layer, the propylene interpolymer can be blended with up to about 80% (by wt.), more preferably up to about 50% (by wt.), even more preferably up to about 30% (by wt.), still more preferably up to about 20% (by wt.), and most preferably up to about 10% (by wt.) of one or more other polymers. Useful blending polymers include, but are not limited to, polyolefins, polystyrene, polyamides, polyesters, ethylene/vinyl alcohol copolymer (EVOH), polyvinylidene chloride (PVDC), polyether, polyurethane, polycarbonate, and the like. Preferred among these are those polymers that include mer units derived from ethylene, propylene, and 1-butene. In some instances, the outer layer preferably can include only those polymers containing mer units derived from $C_2-C_{12}$ α-olefins, ethylenically unsaturated acids, and/or unsaturated esters.

The outer layer preferably has a thickness of from about 0.0025 to about 0.1 mm, more preferably from about 0.005 to about 0.04 mm, even more preferably from about 0.0075 to about 0.025 mm, and most preferably from about 0.01 to about 0.02 mm. Generally, the thickness of the outer layer is from about 1 to about 60%, preferably from about 5 to about 50%, more preferably from about 10 to about 40%, even more preferably from about 12.5 to about 35%, and still more preferably from about 15 to about 30% of the total thickness of the multilayer film.

The second layer includes an ethylene/α-olefin interpolymer having a density of no more than about 0.915 g/cm$^3$, preferably no more than about 0.910 g/cm$^3$, more preferably no more than about 0.905 g/cm$^3$, and most preferably no more than about 0.900 g/cm$^3$. For certain applications, the ethylene/α-olefin interpolymer preferably has a density in the range of from about 0.85 to about 0.915 g/cm$^3$, more preferably of from about 0.871 to about 0.910 g/cm$^3$, even more preferably from about 0.891 to about 0.908 g/cm$^3$, and most preferably from about 0.895 to about 0.905 g/cm$^3$.

Homogeneous ethylene/α-olefin interpolymers differ structurally from heterogeneous ethylene/α-olefin interpolymers in that they exhibit a relatively even sequencing of comonomers within a chain, a mirroring of sequence distribution in all chains, and a similarity of chain lengths (i.e., a narrower molecular weight distribution). Furthermore, homogeneous interpolymers typically are prepared using single-site type catalysts (e.g., metallocenes) rather than Ziegler-Natta catalysts. Examples of commercially available homogeneous interpolymers include metallocene catalyzed EXACT™ linear ethylene/α-olefin copolymers (Exxon Chemical Co.; Baytown, Tex.); TAFMER™ linear ethylene/α-olefin copolymers (Mitsui Petrochemical Corp.); and AFFINITY™ and ENGAGE™ long-chain, branched ethylene/α-olefin copolymers (Dow Chemical Co.).

The ethylene/(α-olefin interpolymer used in the second layer can include those interpolymers of ethylene and any $C_3-C_{12}$ α-olefin, although interpolymers of ethylene and one or more $C_3-C_8$ α-olefins are preferred. Preferred interpolymers are those that include mer units derived from ethylene and one or more of propylene, 1-butene, 1-hexene, and 1-octene.

The second layer preferably includes at least about 20% (by wt.), more preferably at least about 50% (by wt.), even more preferably at least about 70% (by wt.), still more preferably at least about 80% (by wt.), and most preferably at least about 90% (by wt.) of one or more ethylene/ α-olefin interpolymers. However, where desired to change or enhance the properties of the outer layer, the ethylene/α-olefin interpolymer can be blended with up to about 80% (by wt.), more preferably up to about 50% (by wt.), even more preferably up to about 30% (by wt.), still more preferably up to about 20% (by wt.), and most preferably up to about 10% (by wt.) of one or more other polymers. Useful blending polymers include, but are not limited to, polyolefins, polystyrene, polyamides, polyesters, EVOH, PVDC, polyether, polyurethane, polycarbonate, and the like. Preferred among these are those polymers that include mer units derived from ethylene, propylene, and 1-butene.

The ethylene/α-olefin interpolymer of the second layer preferably has a melt index of from about 0.3 to about 50 g/10 min, more preferably of from about 0.4 to about 20 g/10 min, still more preferably of from about 0.5 to about 10 g/10 min, even more preferably of from about 0.6 to about 5 g/10 min, and still more preferably of from about 0.7 to about 3 g/10 min (measured in the same manner as described supra, but at a temperature of 190° C.).

The second layer preferably has a thickness of from about 0.001 to about 0.1 mm, more preferably from about 0.0025 to about 0.025 mm, and most preferably from about 0.005 to about 0.018 mm. The thickness of the second layer preferably is from about 5 to about 50%, more preferably from about 10 to about 45%, even more preferably from about 12.5 to about 40%, still more preferably from about 15 to about 35%, yet more preferably from about 17 to about 25%, and most preferably from about 20 to about 25% of the total thickness of the multilayer film.

The thickness of the outer layer which includes the propylene interpolymer preferably is at least about 50%, more preferably at least about 75%, even more preferably at least about 90%, and most preferably at least about 100% of the thickness of the second layer.

The multilayer film according to the present invention also can include a layer having a low permeance to oxygen, preferably an oxygen permeance of no more than about (in ascending order of preference) 150 $cm^3/m^2 \cdot atm \cdot 24$ hours, 125 $cm^3/m^2 \cdot atm \cdot 24$ hours, 100 $cm^3/m^2 \cdot atm \cdot 24$ hours, 75 $cm^3/m^2 \cdot atm \cdot 24$ hours, 50 $cm^3/m^2 \cdot atm \cdot 24$ hours, 30 $cm^3/m^2 \cdot atm \cdot 24$ hours, 20 $cm^3/m^2 \cdot atm \cdot 24$ hours, and 10 $cm^3/m^2 \cdot atm \cdot 24$ hours. Such an $O_2$-barrier layer preferably has a thickness of from about 0.001 to about 0.05 mm, more preferably from about 0.00125 to about 0.0125 mm, even more preferably from about 0.002 to about 0.0075 mm, and most preferably from about 0.0025 to about 0.005 mm. The thickness of such a barrier layer preferably is from about 1 to about 60%, more preferably from about 2.5 to about 50%, even more preferably from about 3 to about 40%, still more preferably from about 4 to about 30%, yet still more preferably from about 5 to about 25%, and most preferably from about 5 to about 15% of the total thickness of the multilayer film. Such an $O_2$-barrier layer can include one or more of the following polymers: EVOH, PVDC, polyalkylene carbonate, polyamide, and polyester; of the foregoing, EVOH having from about 32 to about 44 mole percent mer units derived from ethylene is particularly preferred.

The multilayer film of the present invention also can include one or more other layers, preferably from one to four additional layers. Such layer(s) can serve as inner or outer layers and can be classified as bulk layers, abuse layers, etc. Such a layer can include one or more polymers that include mer units derived from at least one of a $C_2$–$C_{12}$ α-olefin, styrene, amides, esters, and urethanes. Preferred among these are those homo- and interpolymers that include mer units derived from ethylene, propylene, and 1-butene, even more preferably an ethylene interpolymer such as, for example, ethylene/$C_3$–$C_8$ α-olefin interpolymer, ethylene/ethylenically unsaturated ester interpolymer (e.g., ethylene/butyl acrylate copolymer), ethylene/ethylenically unsaturated acid interpolymer (e.g., ethylene/(meth)acrylic acid copolymer), and ethylene/vinyl acetate interpolymer. Preferred ethylene/vinyl acetate interpolymers are those that include from about 2.5 to about 27.5% (by wt.), preferably from about 5 to about 20% (by wt.), even more preferably from about 5 to about 17.5% (by wt.) mer units derived from vinyl acetate. Such a polymer preferably has a melt index of from about 0.3 to about 50, more preferably from about 0.5 to about 20, still more preferably from about 0.7 to about 10, even more preferably from about 0.9 to about 5, and most preferably from about 1 to about 3.

In one embodiment, the film of the present invention can include a layer derived, at least in part, from a polyester and/or a polyamide. Where a polyester is included, it preferably has a melting point of from about 130° to about 260° C., more preferably from about 150° to about 255° C., even more preferably from about 170° to about 250° C., still more preferably from about 180° to about 245° C., yet still more preferably from about 200° to about 240° C., and most preferably from about 210° to about 235° C. Examples of suitable polyesters include amorphous (co)polyesters, poly(ethylene/terephthalic acid), and poly(ethylene/naphthalate), although poly(ethylene/terephthalic acid) with at least about 75 mole percent, more preferably at least about 80 mole percent, even more preferably at least about 85 mole percent, and most preferably at least about 90 mole percent of its mer units derived from terephthalic acid can be preferred for certain applications.

Where such a layer includes a polyamide, the polyamide can include one or more of polyamide 6, polyamide 9, polyamide 10, polyamide 11, polyamide 12, polyamide 66, polyamide 610, polyamide 612, polyamide 6I, polyamide 6T, polyamide 69, interpolymers made from any of the monomers used to make two or more of the foregoing homopolymers, and blends of any of the foregoing homo- and/or interpolymers. The polyamide preferably has a melting point of from about 130° to about 270° C., more preferably from about 135° to about 260° C., even more preferably from about 140° to about 250° C., still more preferably from about 160° to about 245° C., yet still more preferably from about 180° to about 240° C., and most preferably from about 190° to about 235° C.

Such layers preferably have a thickness of from about 0.0125 to about 1 mm, more preferably from about 0.025 to about 0.5 mm, and most preferably from about 0.05 to about 0.25 mm. The thickness preferably is from about 1 to about 70%, more preferably from about 5 to about 60%, even more preferably from about 10 to about 50%, still more preferably from about 15 to about 45%, and most preferably from about 25 to about 40% based on the total thickness of the multilayer film.

Where an $O_2$-barrier layer (described supra) and an additional layer as just described are included in a multilayer film according to the present invention, the $O_2$-barrier layer preferably is disposed between the second layer and the additional layer.

The multilayer film of the present invention also can include one or more tie layers. Such layers can have a relatively high degree of compatibility with polymers used in $O_2$-barrier layers (e.g., EVOH or polyamide) as well as with polymers used in other, non-barrier layers (e.g., polyolefins). When such a tie layer is present, it preferably is disposed on one or both primary sides of the $O_2$-barrier layer, more preferably directly adhered to one or both primary sides of the $O_2$-barrier layer. Such a tie layer can have a thickness of from about 0.00125 to about 0.05 mm, more preferably from about 0.0015 to about 0.025 mm, even more preferably from about 0.0025 to about 0.01 mm, and most preferably from about 0.003 to about 0.008 mm. Such tie layers can include one or more polymers that contain mer units derived from at least one of $C_2$–$C_{12}$ α-olefin, styrene, amide, ester, and urethane, preferably one or more of anhydride-grafted ethylene/α-olefin interpolymer, anhydride-grafted ethylene/ethylenically unsaturated ester interpolymer, and anhydride-grafted ethylene/ethylenically unsaturated acid interpolymer.

Preferably, the film according to the present invention comprises a total of from 2 to 20 layers; more preferably, from 2 to 12 layers; more preferably, from 2 to 9 layers; more preferably, from 3 to 8 layers.

Various combinations of layers can be used in the formation of the multilayer films according to the invention. Only 2- through 7-layer embodiments re provided here for illustrative purposes; however, the multilayer films of the invention also can include more layers. Given below are some examples of preferred combinations in which letters are used to represent film layers: A/B, A/B/A, A/B/C, A/B/D, A/B/E, A/B/C/D, A/B/C/E, A/B/E/E', A/B/D/E, A/B/D/C, A/B/C/B/A, A/B/C/D/A, A/B/E/B/A, A/B/C/D/E, A/B/C/E/D, A/B/D/C/D, A/B/D/C/E, A/B/D/E/C, A/B/D/E/E', A/B/E/C/E, A/B/E/C/D, A/B/E/D/D', A/B/E/D/E
wherein A represents a layer that includes a polymer including mer units derived from propylene (as described supra);

B represents a layer comprising a homogeneous ethylene/ α-olefin interpolymer having a density up to about 0.915 g/cm³ (as described supra);

C represents a layer including a polymer having a low permeance to oxygen (as described supra);

D and D' represent layers including one or more polymers that include mer units derived from at least one of a $C_2$–$C_{12}$ α-olefin, styrene, amide, ester, and urethane; and E and E' represent layers including a polyester or polyamide.

Of course, one or more tie layers can be used in any of the above structures. Additionally, adjacent layers have different compositions.

Regardless of the structure of the multilayer film of the present invention, one or more conventional packaging film additives can be included therein. Examples of additives that can be incorporated include, but are not limited to, antiblocking agents, antifogging agents, slip agents, colorants, flavorants, antimicrobial agents, meat preservatives, and the like. (The ordinarily skilled artisan is aware of numerous examples of each of the foregoing.) Where the multilayer film is to processed at high speeds, inclusion of one or more antiblocking agents in and/or on one or both outer layers of the film structure can be preferred. Examples of useful antiblocking agents for certain applications are corn starch and ceramic microspheres.

The multilayer film of the present invention preferably exhibits a sufficient Young's modulus so as to withstand normal handling and use conditions. It preferably has a Young's modulus of at least about 200 MPa, more preferably at least about 230 MPa, even more preferably at least about 260 MPa, still more preferably at least about 300 MPa, yet still more preferably at least about 330 MPa, even further more preferably at least about 360 MPa, and most preferably at least about 400 MPa. (Young's modulus is measured in accordance with ASTM D 882, the teaching of which is incorporated herein by reference.)

The multilayer film of the present invention preferably exhibits a shrink tension in at least one direction of at least about 0.33 MPa, more preferably at least about 0.67 MPa. The film preferably exhibits a shrink tension of from about 0.67 to about 3.5 MPa, more preferably from about 1 to about 3.3 MPa, even more preferably from about 1.25 to about 3.1 MPa, still more preferably from about 1.5 to about 3 MPa, yet still more preferably from about 1.6 to about 2.9 MPa, and most preferably from about 1.75 to about 2.75 MPa.

The multilayer film of the present invention preferably is heat shrinkable. More preferably, the film is biaxially oriented and heat shrinkable. At 85° C., it preferably has a total free shrink of from about 5 to about 150%, more preferably from about 10 to about 125%, even more preferably from about 15 to about 100%, still more preferably from about 20 to about 90%, yet still more preferably from about 30 to about 85%, even further more preferably from about 35 to about 80%, yet further more preferably from about 40 to about 80%, and most preferably from about 45 to about 80%.

The multilayer film of the present invention preferably is sequentially or biaxially oriented (preferably at least about 2:1, more preferably at least about 2.5:1, and most preferably at least 3:1 in at least one direction), more preferably biaxially oriented. Orienting involves initially cooling an extruded film to a solid state (by, for example, cascading water or chilled air quenching) followed by reheating the film to within its orientation temperature range and stretching it. The stretching step can be accomplished in many ways such as by, for example, "blown bubble" or "tenter framing" techniques, both of which are well known to those skilled in the art. After being heated and stretched, the film is quenched rapidly while being maintained in its stretched configuration so as to set or lock in the oriented molecular configuration. An oriented film can be annealed to reduce or completely eliminate free shrink in one or more directions.

The measurement of optical properties of plastic films, including the measurement of total transmission, haze, clarity, and gloss, is discussed in detail in Pike, LeRoy, "Optical Properties of Packaging Materials", *Journal of Plastic Film & Sheeting*, vol. 9, no. 3, pp. 173–80 (July 1993), which is incorporated herein by reference. Specifically, haze is a measurement of the transmitted light scattered more than 2.5° from the axis of the incident light. It is measured with a meter similar to a total light transmission meter, with the exception that it contains a light trap to absorb light scattered less than 2.5° as well as regular transmitted light. It is common to measure the total transmitted light first by defeating the light trap and then setting the meter to 100. Then the light trap is allowed to absorb the light scattered less than 2.5° (plus regular transmitted light), and haze is read as a percentage of total transmitted light. Note that the denominator here is total transmitted light ($l_s$+$l_r$), not incident light ($l_i$), as in the measurement of total transmitted light.

The haze of a particular film is determined by analyzing it in accordance with 1990 *Annual Book of ASTM Standards*, section 8, vol. 08.01, ASTM D 1003, "Standard Test Method for Haze and Luminous Transmittance of Transparent Plastics", pp. 358–63, which is incorporated herein by reference. Haze results can be obtained using instrumentation such as, for example, an XL 211 HAZEGARD™ system, (Gardner/ Neotec Instrument Division; Silver Spring, Md.), which requires a minimum sample size of about 6.5 cm$^2$.

The film of the present invention preferably has a haze of less than about 20%, more preferably of less than about 15%, even more preferably less than about 10%, still more preferably less than about 7.5%, and most preferably less than about 5%.

As used herein, "thickness uniformity" refers to a percent value obtained from the formula $$U_t=100-[(t_{max}-t_{min})/t_{max}\times 100]$$

where $U_t$ is thickness uniformity (calculated as a percentage), $t_{max}$ is the measured maximum thickness, and $t_{min}$ is the measured minimum thickness. The maximum and minimum thicknesses are determined by taking a number of thickness measurements (e.g., 10) at regular distance intervals along the entirety of the transverse direction of a film sample, recording the highest and lowest thickness values as the maximum and minimum thickness values, respectively, and computing the thickness uniformity (a percent value) using the formula above. A thickness uniformity of 100% represents a film with perfect uniformity, i.e., no measurable differences in thickness. A film in which the film $t_{min}$ is measured at 45% of the film $t_{max}$ has a thickness uniformity of only 45%.

The multilayer film of the present invention preferably has a thickness uniformity of at least 30%, more preferably at least 40%, even more preferably at least 50%, still more preferably at least 60%, yet still more preferably at least 70%, even further more preferably at least 80%, and most preferably at least 85%.

The multilayer film of the present invention can have any total thickness desired, so long as the film provides the desired properties, e.g. optics, modulus, seal strength, etc., for the particular packaging operation in which the film is used. The multilayer film of the present invention preferably has a total thickness of from about 0.0075 to about 0.25 mm, more preferably from about 0.0125 to about 0.125 mm, more preferably from about 0.025 to about 0.1 mm, even more preferably from about 0.0375 to about 0.09 mm, and most preferably from about 0.045 to about 0.075 mm.

The multilayer film of the present invention can be irradiated and/or corona treated. The former technique involves subjecting a film material to radiation such as corona discharge, plasma, flame, ultraviolet, X-ray, gamma ray, beta ray, and high energy electron treatment, any of which can alter the surface of the film and/or induce crosslinking between molecules of the polymers contained therein. The use of ionizing radiation for crosslinking polymers present in a film structure is disclosed in U.S. Pat. No. 4,064,296 (Bornstein et al.), the teaching of which is incorporated herein by reference. Irradiation is believed to increase interply adhesion by crosslinking the ethylene/α-olefin interpolymer of the second layer (which is a very soft material having a low modulus), to improve the sealability of the film, to reduce edge tear, and to give the film structural integrity and seal strength sufficient to better survive cook-in conditions.

If desired or necessary to increase adhesion to an enclosed meat product, all or a portion of the film of the present invention can be corona and/or plasma treated. Corona/plasma treatment involves bringing a film material into the proximity of an $O_2$- or $N_2$-containing gas (e.g., ambient air) which has been ionized. Various forms of plasma treatment known to those of ordinary skill in the art can be used to corona treat an outer surface of a thermoplastic film material. Exemplary techniques are described in, for example, U.S. Pat. Nos. 4,120,716 (Bonet) and 4,879,430 (Hoffman), the disclosures of which are incorporated herein by reference. Regardless of whether or not the film of the present invention is corona treated, at least the inside (i.e., protein contact) layer thereof preferably has a surface energy of at least about 0.032 J/m$^2$, more preferably at least about 0.034 J/m$^2$, even more preferably at least about 0.036 J/m$^2$, still more preferably at least about 0.038 J/m$^2$, yet still more preferably at least about 0.040 J/m$^2$, even further more preferably at least about 0.042 J/m$^2$, and most preferably at least about 0.044 J/m$^2$.

In another embodiment, especially where the film of the present invention is to be used with whole muscle products, the food-contact layer preferably is relatively non-polar. In such applications, providing a food-contact layer with a low surface energy can be desirable so as avoid pulling off chunks of the whole muscle product when the film is stripped from the product. In such instances, the surface energy of the layer in question preferably is less than about 0.034 J/m$^2$, more preferably less than about 0.032 J/m$^2$, and most preferably less than about 0.030 J/m$^2$.

The film of the present invention preferably can survive cooking for at least two hours, without undergoing delamination or seal failure, at about at least 65° C., more preferably at about at least 70° C., even more preferably at about at least 75° C., still more preferably at about at least 80° C., and most preferably at about at least 85° C. Preferably, the film of the present invention is capable of surviving cooking at the foregoing temperatures for at least about 3 hours, more preferably at least about 5 hours, and most preferably at least about 8 hours. The product being cooked preferably is a meat.

A bag can be made from the film of the present invention by sealing to itself the outer layer that includes a propylene interpolymer, whereby that layer becomes the inside layers of the bag. The bag can be an end-seal bag, a side-seal bag, an L-seal bag (i.e., sealed across the bottom and along one side with an open top), or a pouch (i.e., sealed on three sides with an open top). Additionally, lap seals can be employed.

The film of the present invention can be used to package a variety of products, although it optimally can be used to package proteinaceous food products, particularly meat products. Examples of meat products that can be packaged include, but are not limited to, poultry (e.g., turkey or chicken breast), bologna, braunschweiger, beef, pork, and whole muscle products such as roast beef.

The packaging just described can be done by first forming a bag from the film (as described immediately above), introducing the product into the bag, then sealing the open side of the bag. Alternatively, the film of the present invention can be wrapped substantially completely around the product and then heat sealed so as to form a package. Where such a bag or package is made from a heat shrinkable film according to the present invention, the film can shrink around the product when it is subjected to heat. Where the product being packaged is a food product, it can be cooked by subjecting the entire bag or package to an elevated temperature for a time sufficient to effectuate the degree of cooking desired.

Objects and advantages of this invention are further illustrated by the following examples. The particular materials and amounts thereof, as well as other conditions and details, recited in these examples should not be used to unduly limit this invention.

EXAMPLES

Example 1

A coextruded multilayer film in the form of a tube with a lay-flat width of about 9.5 cm was prepared. Film made from the tube had a structure as shown below (with the first layer being at the inside of the tube and the last layer being at the outside of the tube):

A/B/T/C/T/D wherein
- A was a 0.104 mm (4.1 mils) outer layer made from ELTEX™ P KS 409 propylene/ ethylene copolymer with an ethylene mer content of 3.2% and a melting point of 134° C. (Solvay Polymers; Brussels, Belgium);
- B was a 0.102 mm (4.0 mils) layer made from EXACT™ 3128 homogeneous ethylene/butene copolymer with a density of 0.902 g/cm$^3$ (Exxon Chemical Co.);
- C was a 0.033 mm (1.3 mils) $O_2$-barrier layer made from EVAL™ LC-E105A ethylene/vinyl alcohol copolymer (Eval Co. of America; Lisle, Ill.);
- D was a 0.165 mm (6.5 mils) layer made from a blend of 80% (by wt.) PE 5269T ethylene/vinyl acetate copolymer having a vinyl acetate mer content of 6.5% (Chevron Chemical Co.; Houston, Tex.) and 20% (by wt.) FORTIFLEX™ T60-500-119 high density polyethylene (Solvay Polymers, Inc.; Deer Park, Tex.); and
- each T was a 0.030 mm (1.2 mils) tie layer made from TYMOR™ 1203 anhydride-grafted LLDPE (Morton International; Chicago, Ill.).

Each of the resins (or blend of resins in the case of layer D) were extruded separately between about 1900 and about 260° C. through an annular die heated to approximately 215° C. The resultant extruded multilayer tube was cooled with water and flattened.

The tube was passed through an oscillating beam of an electronic crosslinking unit, where it received a total dosage of 105 kGy. After irradiation, the flattened tape was passed through hot water bath (held at a temperature of from about 960 to about 99° C.) for about 20 seconds. The heated tube was inflated into a bubble (thus orienting it), whereupon it had a lay-flat width of about 28 cm and a total thickness of about 0.058 mm. The bubble was stable, and the optics and appearance of the film were good. When the film tubing was immersed in hot water (85° C.) for about 10 seconds according to the method described in ASTM D 2732-83, it was determined to have about 20% free shrinkage in the longitudinal direction and about 30% free shrinkage in the transverse direction.

The resulting tubing was converted to bags by sealing across the flattened tube with a heated seal bar. These bags were filled with water and 0.1% (by weight) mineral oil, and clipped at the other end to produce packages. The film layer that contacted the water-mineral oil mixture contact layer was the layer denoted as A above.

The packages were cooked for 2 to 12 hours in a high humidity environment held at a temperature from about 82° to about 93° C. After cooling, the packages were evaluated for leaks. None of the seals were found to have failed. Visual and and microscopic inspections of the packages revealed that the film had good interply adhesion, the film withstood the abuses of heat sealing, the film and heat seal withstood the abuses of the high temperature high humidity environment, and the film and heat seal withstood chemical attack from the mineral oil. (Microscopic inspections involved cutting the samples through the seal areas at several sites, then examining the cross sections with a standard microscope using a reflected light mode at 200× magnification.)

Example 2

A coextruded multilayer film in the form of a tube with a lay-flat width of about 9.5 cm was prepared in the same manner as described in Example 1. The film had a structure as shown below (with the first layer being at the inside of the tube and the last layer being at the outside of the tube):

A/B$_1$/T/C/T/D wherein
- A, C, D, and T were the same as in Example 1, and
- B$_1$ was a 0.102 mm (4.0 mils) layer made from SLX 9103 homogeneous ethylene/hexene/butene terpolymer having a density of 0.901 g/cm$^3$ (Exxon Chemical Co.).

The tube was processed as described in Example 1 to produce an oriented film having the same thickness and lay-flat width as the film in Example 1. This film was converted to bags, filled with a water-mineral oil mixture, sealed, and tested as in Example 1. None of the seals were found to have failed.

Example 3

A coextruded multilayer film in the form of a tube with a lay-flat width of about 9.5 cm was prepared in the same manner as described in Example 1. The film had a structure as shown below (with the first layer being at the inside of the tube and the last layer being at the outside of the tube):

A /B$_2$/T/C/T/D wherein
- A, C, D, and T were the same as in Example 1, and
- B$_2$ was a 0.102 mm (4.0 mils) layer made from SLX 9092 homogeneous ethylene/hexene/butene terpolymer having a density of 0.895 g/cm$^3$ (Exxon Chemical Co.).

The tube was processed as described in Example 1 to produce an oriented film having the same thickness and lay-flat width as the film in Example 1. This film was converted to bags, filled with a water-mineral oil mixture, sealed, and tested as in Example 1. None of the seals were found to have failed.

Comparative Example 1

Samples of commercially available bags were formed, filled, and subjected to the same high temperature and high humidity and exposure to mineral oil as described in Example 1. The second layer of these bags (corresponding to layer B, B$_1$, and B$_2$ in the films of Examples 1–3, respectively) included a blend of 70% ethylene/vinyl acetate copolymer having a 6.5% vinyl acetate mer content and 30% ethylene/propylene copolymer having a 20% propylene mer content. All the other layers of the film had the same thicknesses, compositions, and positions as the films of Examples 1–3. Also, the thickness of the second layer of this film was the same as the thicknesses of the second layers in the film of Examples 1–3.

Bags of this type have been used for several years, especially for cooking meat products. In some applications, this type of sealed bag failed to contain the product when subjected to high temperature and high humidity conditions as part of cooking due to seal failure. (Other types of failures observed included ruptured bag walls and pinhole leaks in the seals.)

Example 4

Cook tests were conducted on bags made from films described in Examples 1–3 and compared to the results of identical cook tests on the commercial bags. Film tubing was heat sealed on one end, filled with a mixture of 0.1% mineral oil in water solution, clipped on the other end so as to form packages. Twenty-four of these packages were heated for three hours at about 93° C. while 60 were heated for about 12 hours at about 82° C.

The results of these tests are compiled in Table 1 immediately below.

TABLE 1

| Type of film used in bag | Percentage of failures- 93° C. test | Percentage of failures- 82° C. test |
| --- | --- | --- |
| Ex. 1 | 0% | 0% |
| Ex. 2 | 0% | 0% |
| Ex. 3 | 0% | 0% |
| Comparative 1 | 100% | 60% |

The data of Table 1 show that films in which the second layer (i.e., the layer adjacent to the outer layer which includes a polymer including mer units derived from propylene) includes a homogeneous ethylene/α-olefin interpolymer with a density of no more than about 0.915 g/cm³ survive cooking, have strong seals, and do not delaminate when subjected to rigorous temperature and chemical conditions. This is in contrast to commercially available films in which the second layer includes a 70/30 (by wt.) blend of ethylene/vinyl acetate copolymer and ethylene/propylene copolymer, even though the ethylene/propylene copolymer of the second layer adheres well with the propylene copolymer used in the first layer.

Example 5

For the non-oriented tubes and the oriented films made therefrom of Examples 1–3 as well as Comparative Example 1, interply bond strength was evaluated. For the tubes and films from Examples 1–3, it was not possible to initiate or sustain delamination at the interface between the first and second layers (i.e., layers A and B).

The non-oriented material from Comparative Example 1 could be delaminated only after using a solvent to initiate the peel and only with great difficulty, i.e., by applying a force of 37.8 N. However, the oriented film from Example 1 was delaminated more easily and peeled with a force of only 0.62 N.

This shows that a film according to the present invention retains its good interply adhesion after orientation whereas previously available films, although having good interply adhesion prior to orientation, have poor interply adhesion after orientation.

Comparative Example 2

A coextruded multilayer film in the form of a tube with a lay-flat width of about 9.5 cm was prepared in the same manner as described in Example 1. The film had a structure as shown below (with the first layer being at the inside of the tube and the last layer being at the outside of the tube):

A/B₃/T/C/T/D wherein

A, C, D, and T were the same as in Example 1, and

B₃ was a 0.102 mm (4.0 mils) layer made from ELITE™ 5400 homogeneous ethylene/octene copolymer having a density of 0.916 g/cm³ (Dow Chemical Co.).

The tube was processed as described in Example 1 to produce an oriented film having the same thickness and lay-flat width as the film of Example 1. This film was converted into ten bags, which were filled with a water-mineral oil mixture, sealed, and tested as in Example 1. Four of the sealed packages leaked due to failed seals when heated to about 93° C. for about 2 hours.

This demonstrates that not all homogenous ethylene α-olefin interpolymers yield the desired attributes of the film of the present invention. Instead, only those with densities of no more than about 0.915 g/cm³ yield the desired results.

Various modifications and alterations that do not depart from the scope and spirit of this invention will become apparent to those skilled in the art. This invention is not to be unduly limited to the illustrative embodiments set forth herein.

We claim:

1. A multilayer film comprising:
   a) a first layer as an outer layer which comprises a polymer comprising mer units derived from propylene; and
   b) directly adhered to said first outer layer, a second layer comprising a homogeneous ethylene/α-olefin interpolymer having a density of no more than about 0.915 g/cm³, wherein:
      said multilayer film is oriented and has a free shrink at 85° C. of at least 5% in at least one direction; and
      said homogeneous ethylene/α-olefin interpolymer is crosslinked to the extent that said second layer is not delaminated from said first layer after two hours submersion in water at 65° C.

2. The multilayer film of claim 1 wherein said polymer comprising mer units derived from propylene further comprises mer units derived from

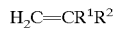

where, independently,

R¹ is H or a C₁–C₆ alkyl group and

R² is H, a C₂–C₆ alkyl group, or a C(O)OR³ group wherein R³ is H or a C₁–C₆ alkyl group.

3. The multilayer film of claim 1 wherein said polymer comprising mer units derived from propylene of said outer layer has at least one of a melting point of no more than about 155° C. and a Vicat softening point of at least about 80° C.

4. The multilayer film of claim 1 wherein said outer layer comprises at least about 80% by weight of said polymer comprising mer units derived from propylene.

5. The multilayer film of claim 1 wherein said ethylene/α-olefin interpolymer of said second layer has a density of at least about 0.85 g/cm³.

6. The multilayer film of claim 1 wherein said ethylene/α-olefin interpolymer of said second layer is a long-chain branched interpolymer.

7. The multilayer film of claim 1 wherein said ethylene/α-olefin interpolymer of said second layer comprises mer units derived from a C₃–C₈ α-olefin.

8. The multilayer film of claim 1 wherein said second layer further comprises up to about 80 weight percent of one or more other polymers.

9. The multilayer film of claim 1 further comprising a layer having a low permeance to oxygen.

10. The multilayer film of claim 9 wherein said layer having a low permeance to oxygen comprises at least one of ethylene/vinyl alcohol copolymer, poly(vinylidene chloride), polyalkylene carbonate, polyamide, and polyester.

11. The multilayer film of claim 1 further comprising a third layer comprising a polymer comprising mer units derived from at least one of C₂–C₁₂ α-olefin, styrene, amide, ester, and urethane.

12. The multilayer film of claim 11 wherein said third layer comprises a polymer comprising mer units derived from at least one of ethylene, propylene, and 1-butene.

13. The multilayer film of claim 11 wherein said third layer comprises at least one of a polyester and a polyamide.

14. The multilayer film of claim 13 wherein said polyamide comprises mer units derived from one or more of polyamide 6, polyamide 9, polyamide 10, polyamide 11, polyamide 12, polyamide 66, polyamide 610, polyamide 612, polyamide 61, polyamide 6T, polyamide 69, and interpolymers derived from the monomers involved in making any two or more of the foregoing.

15. The multilayer film of claim 11 further comprising an abuse layer comprising a polymer comprising mer units derived from at least one of $C_2$–$C_{12}$ α-olefin, styrene, amide, ester, and urethane.

16. The multilayer film of claim 15 wherein said abuse layer comprises a polyamide which comprises one or more of polyamide 6, polyamide 9, polyamide 10, polyamide 11, polyamide 12, polyamide 66, polyamide 610, polyamide 612, polyamide 61, polyamide 6T, polyamide 69, and interpolymers derived from the monomers involved in making any two or more of the foregoing.

17. An oriented multilayer film comprising:
  a) a first outer layer comprising a polymer comprising mer units derived from propylene;
  b) a second outer layer; and disposed between said first and second outer layers,
  c) a first inner layer comprising a homogeneous ethylene/α-olefin interpolymer having a density of no more than about 0.915 g/cm$_3$, said first inner layer being directly adhered to said first outer layer;
  d) a second inner layer comprising a polymer with a low permeance to oxygen; and
  e) a third inner layer, said second inner layer being disposed between said first and third inner layers, said film optionally further comprising one or both of a tie layer between said first and second inner layers and a tie layer between said second and third inner layers, wherein:
    said multilayer film is oriented and has a free shrink at 85° C. of at least 5% in at least one direction; and
    said homogeneous ethylene/α-olefin interpolymer is crosslinked to the extent that said first inner layer is not delaminated from said first outer layer after two hours submersion in water at 65° C.

18. A bag comprising the film of claim 1 wherein the outer layer comprising a polymer comprising mer units derived from propylene is sealed to itself so as to form a bag, wherein said outer film layer becomes the inside layer of said bag.

19. A method of cooking a food product comprising:
  a) substantially completely surrounding said food product in the film of claim 1 to form a packaged food product; and
  b) subjecting said packaged food product to an elevated temperature sufficient to cook said food product.

20. The multilayer film of claim 1 wherein the film has a total free shrink of from about 5 to about 150% at 85° C.

21. The multilayer film of claim 1 wherein the film has a total free shrink of from about 10 to about 125% at 85° C.

22. The multilayer film of claim 1 wherein the film has a total free shrink of from about 15 to about 100% at 85° C.

23. The multilayer film of claim 1 wherein said crosslinking exists to the extent that said second layer does not delaminate from said first layer after two hours submersion in water at 80° C.

24. The multilayer film of claim 1 wherein said crosslinking exists to the extent that said second layer does not delaminate from said first layer after three hours submersion in water at 85° C.

25. The multilayer film of claim 1 wherein said crosslinking exists to the extent that said second layer does not delaminate from said first layer after three hours submersion in water at 93° C.

26. The multilayer film of claim 1 wherein the second layer comprises a homogeneous ethylene/α-olefin interpolymer having a density of no more than about 0.910 g/cm$^3$.

27. The multilayer film of claim 1 wherein the second layer comprises a homogeneous ethylene/α-olefin interpolymer having a density of no more than about 0.905 g/cm$^3$.

28. The multilayer film of claim 1 wherein the second layer comprises a homogeneous ethylene/α-olefin interpolymer having a density of no more than from about 0.891 to about 0.908 g/cm$^3$.

29. The multilayer film of claim 1 wherein the second layer comprises a homogeneous ethylene/α-olefin interpolymer having a density of no more than about 0.900 g/cm$^3$.

30. The multilayer film of claim 1 wherein the second layer is an inner layer.

31. The multilayer film of claim 1 wherein said crosslinking exists to the extent that the second layer does not delaminate from the first layer after two hours submersion in water at 65° C. and exposure to 37.8 N of peel force.

32. The multilayer film of claim 1 wherein the film has been irradiated by exposure to high energy electron treatment to induce crosslinking and to increase interply adhesion such that said second layer does not delaminate from said first layer after two hours submersion in water at 65° C.

33. The method of claim 19 wherein the surrounding step includes substantially completely surrounding a food product comprising meat in the film of claim 1.

34. The method of claim 19 wherein the film does not delaminate after the step of subjecting the packaged food product to an elevated temperature.

35. A method of cooking a food product comprising:
  a) substantially completely surrounding said food product in the film of claim 24 to form a packaged food product; and
  b) subjecting said packaged food product to an elevated temperature sufficient to cook said food product, wherein the film does not delaminate after the step of subjecting the packaged food product to an elevated temperature.

36. The multilayer film of claim 1 wherein the second layer comprises at least about 70% by weight of the second layer of the homogeneous ethylene/α-olefin interpolymer.

37. The multilayer film of claim 1 wherein the second layer comprises at least about 80% by weight of the second layer of the homogeneous ethylene/α-olefin interpolymer.

38. The multilayer film of claim 1 wherein the second layer comprises at least about 90% by weight of the second layer of the homogeneous ethylene/α-olefin interpolymer.

* * * * *

UNITED STATES PATENT AND TRADEMARK OFFICE
CERTIFICATE OF CORRECTION

PATENT NO.    : 6,500,505 B2                                      Page 1 of 1
DATED         : December 31, 2002
INVENTOR(S)   : Graham R. Piper and Ram K. Ramesh It is certified that error appears in the above-identified patent and that said Letters Patent is hereby corrected as shown below:

<u>Column 17,</u>
Lines 10 and 21, "polyamide 61," should be -- polyamide 6I --

Signed and Sealed this

Fourth Day of March, 2003

JAMES E. ROGAN
*Director of the United States Patent and Trademark Office*